3,660,382
18-METHYL-2α-3α-EPITHIO-5α-ANDROSTANE
DERIVATIVES
Taichiro Komeno, Osaka-shi, Japan, assignor to
Shionogi & Co., Ltd., Osaka, Japan
No Drawing. Filed Mar. 17, 1969, Ser. No. 807,916
Claims priority, application Japan, Mar. 18, 1968,
43/17,702
Int. Cl. C07c 173/00
U.S. Cl. 260—239.5    2 Claims

ABSTRACT OF THE DISCLOSURE

A compound of the formula

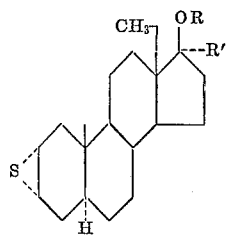

wherein R represents a hydrogen atom, a lower alkanoyl group or 1-lower alkoxycycloalkyl group and R′ is a hydrogen atom or lower alkyl group, has strong anti-estrogenic activity accompanied with lesser side effects such as androgenic and myogenic activities.

---

The present invention relates to 18-methyl-2α,3α-epithio-5α-androstane derivatives. More particularly it relates to 18-methyl-17-oxygenated-2α,3α-epithio-5α-androstane derivatives (18-methyl-17-oxygenated-2α,3α-epithio-10-methyl-13-ethyl-5α,14α-gonane derivatives) of the formula:

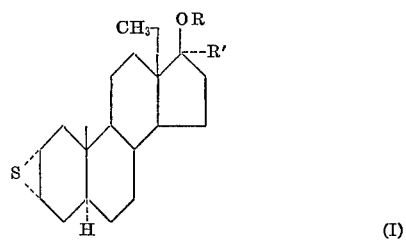

wherein R represents a hydrogen atom, a lower alkanoyl group or 1-lower alkoxycycloalkyl group and R′ represents a hydrogen atom or lower alkyl group.

The compounds of the present invention are 2α,3α-epithio-18-methyl-5α-androstan-17β-ol and its modifications at the position 17. The lower alkyl group at position 17α represented by R′ may be an alkyl group having up to 4 carbon atoms, e.g., methyl, ethyl, propyl, butyl, isobutyl, and the like. The alkanoyl group represented by R is a lower alkanoyl group, e.g., formyl, acetyl, propionyl, valeryl, enanthoyl, trimethylacetyl, tert-butylacetyl, cycloalkylalkanoyl, adamantoyl, etc., and the 1-lower alkoxycycloalkyl group represented by R may be 1-methoxycyclopentyl and the like.

Representative of the compounds of the present invention include: 2α,3α-epithio-18-methyl-5α-androstan-17β-ol, 2α,3α-epithio-17α,18-dimethyl-5α-androstan-17β-ol, 2α,3α-epithio-18-methyl-5α-androstan-17β-ol alkanoates, 2α,3α-epithio-18-methyl-17β-(1-methoxycyclopentyl)oxy-5α-androstane, 2α,3α-epithio-18-methyl-17α-ethyl-5α-androstan-17β-ol, 2α,3α-epithio-17α-ethynyl-18-methyl-5α-androstan-17β-ol and the like.

The compounds of the Formula I are preparable by several methods in analogy to the known methods. For example, 18-methylpregn-5-ene-3β,20β-diol is converted to 3-monobenzoate, M.P. 170–172° C., hydrogenated to 3-cyclohexylcarboxylate of 18-methyl-5α-pregnane-3β,20-diol, M.P. 183–184° C., oxidized to the 20-oxo compound, M.P. 129–130° C., hydrolyzed and subjected to Baeyer Villiger reaction to obtain 17β-acetyloxy-18-methyl-5α-androstan-3β-ol, and its acetate group is hydrolyzed, oxidized to obtain 18-methyl-5α-androstan-3,17-dione, M.P. 129.5–130° C., protected at its 3-oxo group by formation of 3,3-dimethoxy-18-methyl-5α-androstan-17-one, M.P. 123–124° C., reducing its 17-ketone and removing its protecting group at position 3 affords 17β-hydroxy-18-methyl-5α-androstan-3-one, M.P. 165–167° C. The monoketone is brominated at position 2, reduced at its 3-oxo group and treated with alkali to afford 2β,3β-epoxy-18-methyl-5α-androstan-17β-ol, M.P. 140–142° C. The epoxy compound is treated with thiocyanic acid to give 3α-thiocyanato-18-methyl-5α-androstane-2β,17β-diol, M.P. 208–211° C. (decomp.) and then the last compound is treated with a base according to the procedure of Example 1 to yield 2α,3α-epithio-18-methyl-5α-androstan-17β-ol, which is then transformed by the conventional method to 17-lower alkanoate or 1-alkoxycycloalkyl ether, or oxidized and alkylated at 17-oxo group to give the 71α-lower alkyl group. Alternatives known to those skilled in the art, for example, introduction of a 17-alkyl group to 3,3-dimethoxy-18-methyl-5α-androstan-17-one cited above, substitution of the bromine group of 2α-bromo-17β-hydroxy-18-methyl-5α-androstan-3-one with thiocyanato group followed by reduction of 3-oxo group and epithio group formation with a base and the like, are possible for preparation of the compounds of the present invention.

Endocrinological studies of the compound of the Formula I have shown that they possess useful metabolic, hormonal and antihormonal properties. In particular, they exhibit strong antiestrogenic activity accompanied with lesser side effects. The parent compound lacking a methyl group at position 18, namely a 2α,3α-epithio-5α-androstane compound has been utilized as a most potent anabolic and antiestrogenic agent. However, it still possessed about half the androgenic activity of testosterone. Therefore, when the compound is administered to a female or when the androgenic effect is undesirable to the patient, side effects such as virilism, are serious problems to be solved prior to clinical use. In contrast, the compounds of the Formula I of the present invention have an antiestrogenic activity of the same order of the parent compound and related activities are but one fifth to one twentieth of the androgenic activity and one fourth to one twentieth of the myogenic activity of the parent compound, when estimated on rats at a daily dose of 1 μg. to 500 mg. per kilogram of the body weight. Thus the compound of the Formula I of the present invention is useful for treatment of mastopathia, gynecomastia, and treatment of diseases demanding antiestrogenic agents, with lesser side effects for human and veterinary use.

The compounds of the Formula I of the present invention can be prepared for oral or parenteral dosage forms, solely or in admixture with other co-acting substances. They may be administered with a pharmaceutical carrier which can be a solid material or a liquid material in which the compound is dissolved, dispersed or suspended. The solid compositions can take the form of tablets, powders, granules, capsules or pills, the liquid composition may take the form of injections, ointments, dispersions, suspensions, solutions, emulsions, syrups or elixirs. They may be flavored, colored, and tablets and granules may be coated. Diluents, coloring agents, aromatic substances, flavoring substances, bulking agents, binders, disintegrators, lubricants, ointment bases, solvents, solubilizing agents, buffers and stabilizing agents may be used if the agents do not exert an adverse effect on the compounds.

The following examples are given by way of illustration only and are not intended as limitations of the present invention, many apparent variations of which are possible without departing from the spirit and scope thereof. The abbreviations have the conventional meanings.

EXAMPLE 1

Preparation of 2α,3α-epithio-18-methyl-5α-androstan-17β-ol

A mixture of 1,480 g. 3α-thiocyanato-18-methyl-5α-androstan-2β,17β-diol, 1.5 g. potassium carbonate, 15 ml. dioxane, 15 ml. methanol and 7 ml. water is stirred overnight at room temperature. The reaction mixture is diluted with water and extracted with methylene chloride. The extract solution is washed with water, dried over anhydrous sodium sulfate and evaporated in vacuo. Recrystallization of the residue from petroleum ether gives 2α,3α-epithio-18-methyl-5α-androstan-17β-ol, M.P. 70–72° C. $[\alpha]_D^{23}$ +21.5±0.6° (c.=1.007, in chloroform).

IR: $\nu_{max.}^{Nujol}$ 3476, 3240, 1077, 1063 cm$^{-1}$

Analysis.—Calcd. for $C_{20}H_{32}OS$ (percent): C, 74.94; H, 10.06; S, 10.00. Found (percent): C, 74.76; H, 10.30; S, 9.85.

EXAMPLE 2

Preparation of 2α,3α-epithio-18-methyl-5α-androstan-17β-ol acetate

2α,3α-epithio-18-methyl-5α - androstan-17β-ol is dissolved in 6 ml. pyridine and mixed with 2 ml. acetic anhydride and kept at room temperature overnight. The reaction mixture is evaporation in vacuo to dryness and the residue is dissolved in methylene chloride, washed with 10% aqueous solution of sodium carbonate and water, dried over anhydrous sodium sulfate and evaporated in vacuo to dryness. Purification of the residue by chromatography over 39 g. alumina gives 1.254 g. 2α,3α-epithio-18 - methyl - 5α - androstan-17β-ol acetate. Yield: 85.0%. M.P. 110–111.5° C. $[\alpha]_D^{25}$ +26.3±0.7° (c.=0.969, chloroform).

IR: $\nu_{max.}^{Nujol}$ 1733, 1251, 1240, 1220, 1045 cm.$^{-1}$

Analysis.—Calcd. for $C_{22}H_{34}O_2S$ (percent): C, 72.77; H, 9.45; S, 8.84. Found (percent): C, 73.02; H, 9.48; S, 8.59.

EXAMPLE 3

Preparation of 2α,3α-epithio-17β-(1-methoxycyclopentyl)oxy-18-methyl-5α-androstane A suspension of 100 mg. of 2α,3α-epithio-18-methyl-5α-androstan-17β-ol in 10 ml. dichloromethane has added thereto 0.7 ml. of 1,1-dimethoxycyclopentane and 3 mg. of pyridine salt of p-toluenesulfonic acid, the mixture is warmed for three hours on a water bath (bath temperature 50° C.) with azeotropic distillation. After the addition of two drops of pyridine to the reaction mixture, the latter is evaporated under reduced pressure. Purification of the residue by chromatography over alumina gives pure 2α,3α-epithio-17β-(1-methoxycyclopentyl)oxy-18-methyl-5α-androstane.

EXAMPLE 4

Preparation of 2α,3α-epithio-17α,18-dimethyl-5α-androstan-17β-ol (1a) To a solution of 299 mg. 2β,3β-epoxy-18-methyl-5α-androstan-17β-ol in 6 ml. pyridine is added 300 mg. chromium trioxide and the mixture is kept at room temperature overnight. The reaction mixture is diluted with a mixture of water and 10% hydrochloric acid and extracted with a mixture of ether and methylene chloride. The extract solution is washed with 10% hydrochloric acid, water, 10% aqueous solution of sodium carbonate and water in order, dried over anhydrous sodium sulfate and evaporated. The residue is dissolved in benzene, passed through filter pad of 4 g. alumina to remove contaminant and evaporated to dryness to give 197 mg. residue, 2β,3β-epoxy-18-methyl-5α-androstan-17-one.

IR: $\nu_{max.}^{CCl_4}$ 1730 cm.$^{-1}$ (1b) The residue is dissolved in benzene and mixed with a solution of methyl lithium in ether prepared from 500 mg. lithium and kept at room temperature for two days. The reaction mixture is worked up as usual gives residue which is purified by thin-layer chromatography to afford 61 mg. 2β,3β-epoxy-17α,18-dimethyl-5α-androstan-17β-ol, which is dissolved in ether and treated with ether solution of thiocyanic acid to give 50 mg. 3α-thiocyanato-17α, 18-dimethyl-5α-androstan-2β,17β-diol.

IR: $\nu_{max.}^{Nujol}$ 3320, 2160 cm.$^{-1}$

The latter is dissolved in a mixture of 1 ml. dioxane and 1 ml. methanol and mixed with a solution of 70 mg. potassium carbonate in 0.5 ml. water. The mixed solution is stirred overnight at room temperature. The reaction mixture is diluted with water and extracted with methylene chloride. The extract solution is washed with water, dried over anhydrous sodium sulfate and evaporated in vacuo. Purification of the residue by thin-layer chromatography and recrystallization from a mixture of acetone and hexane gives 30 mg. 2α,3α-epithio-17α,18-dimethyl-5α-androstan-17β-ol. M.P. 133–134° C. $[\alpha]_D^{24}$ +1.6±0.8° (c.=0.491, chloroform).

IR: $\nu_{max.}^{Nujol}$ 3458, 1147, 1107, 1098, 943, 904 cm.$^{-1}$

Analysis.—Calcd. for $C_{21}H_{34}OS$ (percent): C, 75.39; H, 10.24; S, 9.58. Found (percent): C, 75.55; H, 10.34; S, 9.57.

(2) To a solution of 300 mg. 2α,3α-epithio-18-methyl-5α-androstan-17β-ol in 6 ml. pyridine is added 300 mg. chromium trioxide and stirred overnight at room temperature. The reaction mixture is diluted with water and 10% hydrochloric acid and extracted with water, dried and evaporated in vacuo, to give 278 mg. 2α,3α-epithio-18-methyl-5α-androstan-17-one, which is dissolved in 5 ml. dioxane, mixed with a solution of methylmagnesium iodide in ether prepared from 500 mg. methyl iodide and refluxed for one hour. The reaction mixture is mixed with 10% aqueous solution of ammonium chloride and extracted with ether. The extract solution is washed with water, dried and evaporated in vacuo. Recrystallization of the residue from a mixture of acetone and hexane affords 143 mg. 2α,3α-epithio-17α,18-dimethyl-5α-androstan-17β-ol. M.P. 133–135° C.

In a similar manner, 2α,3α-epithio-17α-ethynyl-18-methyl-5α-androstan-17β-ol is prepared from 2α,3α-epithio-18-methyl-5α-androstan-17β-ol through 17-oxo compound.

EXAMPLE 5

Preparation of 2α,3α-epithio-18-methyl-5α-androstan-17β-ol

A mixture of 240 mg. 2α-bromo-3-oxo-18-methyl-5α-androstan-17β-ol and 160 mg. potassium thiocyanate in 640 ml. acetone is refluxed over water bath for 5 hours. The reaction mixture is cooled and filtered to remove solid material and concentrated to dryness. The residue is dissolved in methylene chloride and washed with water, dried over anhydrous sodium sulfate and evaporated in vacuo. Recrystallization of the residue from ether gives 2α-thiocyanato-3-oxo-18-methyl-5α-androstan-17β-ol, and the latter is dissolved in methanol and mixed with a solution of 60 mg. sodium borohydride in methanol. The mixture is kept at room temperature for 3 hours, then diluted with water, extracted with methylene chloride and washed with water. The solution is dried over anhydrous sodium sulfate and evaporated to dryness. The residue is dissolved in 10 ml. methanol and mixed with a solution of 50 mg.

potassium carbonate in 5 ml. methanol. After standing at room temperature overnight, the mixture is diluted with water, extracted with methylene chloride and washed with water. The washed solution is dried over anhydrous sodium sulfate and evaporated to dryness. Recrystallization of the residue from mixture of acetone and ether gives 89 mg. 2α,3α-epithio - 18 - methyl-5α-androstan-17β-ol M.P. 70–72° C.

EXAMPLE 6

Preparation of injection

A solution in oil for intramuscular injection, composed of 10 mg. of 2α,3α-epithio-18-methyl-5α-androstan-17β-ol in 1 ml. of anhydrous sesame oil is prepared by sterilized procedure and administered once or twice a week to a patient, e.g. a man with mastopathia.

EXAMPLE 7

Preparation of tablets

Ten tablets are prepared from 25 mg. 2α,3α-epithio-17α-18-dimethyl-5α-androstan-17β-ol, 750 mg. lactose, 220 mg. corn starch, 30 mg. magnesium stearate and 1.9 g. sucrose, using gum arabic, talc, distilled water, colouring agent and then coated with sugar syrup, gum arabic and talc. Four tablets are administered to a patient per a day, e.g. a man having gynecomastia.

What I claim is:
1. The compound 2α,3α-epithio - 18 - methyl-5α-androstan-17β-ol.
2. The compound 2α,3α-epithio - 18 - methyl-5α-androstan-17β-ol acetate.

References Cited

UNITED STATES PATENTS

| 3,239,542 | 3/1966 | Bowers et al. | 260—397.5 |
| 3,301,876 | 1/1967 | Klimstra | 260—397.3 |
| 3,405,124 | 10/1968 | Klimstra | 260—239.5 |
| 3,452,004 | 6/1969 | Strike et al. | 260—239.55 |

OTHER REFERENCES

Applezweig, Steroid Drugs, McGraw-Hill, 1962, pp. 507–509.

Klimstra et al., Jour. Medicin. Chem., September 1966, pp. 693–697.

Rees et al., Steroids, May 1968, pp. 649–666, pp. 652, 653, 661 and 663 pertinent.

LEWIS GOTTS, Primary Examiner

E. G. LOVE, Assistant Examiner

U.S. Cl. X.R.

260—239.55 R, 397.3, 397.4, 397.5; 424—241